(12) United States Patent  (10) Patent No.: US 10,061,981 B2
Omar  (45) Date of Patent: Aug. 28, 2018

(54) SECURITY IMPROVEMENTS FOR TICKETS

(71) Applicant: Omarco Network Solutions Limited, Douglas, Isle of Man, British Isles (GB)

(72) Inventor: Ralph Mahmoud Omar, Douglas (GB)

(73) Assignee: Omarco Network Solutions Limited, Douglas Isle of Man, British Isles (GB)

( * ) Notice: Subject to any disclaimer, the term of this patent is extended or adjusted under 35 U.S.C. 154(b) by 123 days.

(21) Appl. No.: 14/647,061

(22) PCT Filed: Nov. 25, 2013

(86) PCT No.: PCT/GB2013/053111
§ 371 (c)(1),
(2) Date: May 22, 2015

(87) PCT Pub. No.: WO2014/080232
PCT Pub. Date: May 30, 2014

(65) Prior Publication Data
US 2015/0310271 A1  Oct. 29, 2015

(30) Foreign Application Priority Data

Nov. 23, 2012 (GB) .................................. 1221183.5
Dec. 11, 2012 (GB) .................................. 1222266.7

(51) Int. Cl.
*H04L 9/28* (2006.01)
*G06K 9/00* (2006.01)
(Continued)

(52) U.S. Cl.
CPC ....... *G06K 9/00577* (2013.01); *G06Q 20/045* (2013.01); *G06Q 20/385* (2013.01);
(Continued)

(58) Field of Classification Search
CPC ....... G06K 9/00577; G06K 2009/0059; G06Q 20/045; G06Q 20/0385; G07F 7/1066;
(Continued)

(56) References Cited

U.S. PATENT DOCUMENTS 6,505,179 B1 * 1/2003 Kara ................ G07B 17/00508
101/71
6,735,575 B1 * 5/2004 Kara ................ G07B 17/00508
283/57
(Continued)

FOREIGN PATENT DOCUMENTS

WO  2009019602 A2  2/2009
WO  2011/161660 A2  12/2011
WO  2011161660  * 12/2011 ............ H04W 40/22

OTHER PUBLICATIONS

ISR/WO dated Mar. 12, 2014 for PCT/GB2013053111 filed Nov. 25, 2013, pages.

*Primary Examiner* — Sharon Lynch
(74) *Attorney, Agent, or Firm* — Armstrong Teasdale LLP

(57) ABSTRACT

A method of validating the authenticity of a ticket including a unique ticket identifier generated at an issuing terminal in accordance with a confidential algorithm is provided. The method includes receiving one or more identification variable values expressed with respect to a first coordinate measurement domain, the one or more identification variable values enabling the location of ticket verification information within the unique ticket identifier to be determined, using a coordinate transform function configured to map coordinate values from the first coordinate measurement domain to a second coordinate measurement domain to calculate one or more values of the one or more received identification variable values with respect to the second coordinate measurement domain, extracting the verification information from the unique ticket identifier on the basis of
(Continued)

the calculated identification variable values, and verifying the authenticity of the ticket on the basis of the extracted verification information.

10 Claims, 4 Drawing Sheets

(51) Int. Cl.
| | |
|---|---|
| *G07F 17/42* | (2006.01) |
| *G06Q 20/04* | (2012.01) |
| *G06Q 20/38* | (2012.01) |
| *G07B 15/00* | (2011.01) |
| *G07F 7/10* | (2006.01) |
| *H04K 1/10* | (2006.01) |
| *H04B 1/10* | (2006.01) |
| *H04K 1/02* | (2006.01) |

(52) U.S. Cl.
CPC ............ *G07B 15/00* (2013.01); *G07F 7/1066* (2013.01); *G07F 17/42* (2013.01); *H04B 1/1027* (2013.01); *H04K 1/02* (2013.01); *H04K 1/10* (2013.01); *G06K 2009/0059* (2013.01)

(58) Field of Classification Search
CPC ........ G07F 17/42; H04B 1/1027; H04K 1/02; H04K 1/10
See application file for complete search history.

(56) References Cited

U.S. PATENT DOCUMENTS

| | | | | |
|---|---|---|---|---|
| 7,174,031 | B2* | 2/2007 | Rhoads | G06Q 30/02 |
| | | | | 382/107 |
| 8,001,052 | B2* | 8/2011 | Dunkeld | G06Q 10/10 |
| | | | | 705/51 |
| 8,200,581 | B2* | 6/2012 | Dunkeld | G06Q 10/10 |
| | | | | 382/100 |
| 8,583,556 | B2* | 11/2013 | Dunkeld | G06Q 10/10 |
| | | | | 705/51 |
| 8,606,856 | B2* | 12/2013 | Dunkeld | G06Q 10/10 |
| | | | | 709/201 |
| 8,626,838 | B2* | 1/2014 | Dunkeld | G06Q 10/10 |
| | | | | 709/201 |
| 8,706,636 | B2* | 4/2014 | Dunkeld | G06Q 10/10 |
| | | | | 705/52 |
| 8,915,780 | B2* | 12/2014 | Irwin, Jr. | G07F 17/329 |
| | | | | 463/25 |
| 9,721,425 | B2* | 8/2017 | Irwin, Jr. | G07F 17/3225 |
| 2003/0110126 | A1* | 6/2003 | Dunkeld | G06Q 10/10 |
| | | | | 705/39 |
| 2003/0229790 | A1* | 12/2003 | Russell | G06Q 10/02 |
| | | | | 713/172 |
| 2005/0105774 | A1* | 5/2005 | Kreuter | G06K 1/02 |
| | | | | 382/112 |
| 2005/0240484 | A1 | 10/2005 | Yan et al. | |
| 2006/0071046 | A1* | 4/2006 | Roberts | G07F 11/68 |
| | | | | 225/10 |
| 2008/0215632 | A1* | 9/2008 | Dunkeld | G06Q 10/10 |
| 2008/0215633 | A1* | 9/2008 | Dunkeld | G06Q 10/10 |
| 2009/0210345 | A1* | 8/2009 | Mandy | G06Q 20/3674 |
| | | | | 705/50 |
| 2011/0302064 | A1* | 12/2011 | Dunkeld | G06Q 10/10 |
| | | | | 705/30 |
| 2011/0302065 | A1* | 12/2011 | Dunkeld | G06Q 10/10 |
| | | | | 705/30 |
| 2011/0302086 | A1* | 12/2011 | Dunkeld | G06Q 10/10 |
| | | | | 705/44 |
| 2011/0302303 | A1* | 12/2011 | Dunkeld | G06Q 10/10 |
| | | | | 709/224 |
| 2011/0302636 | A1* | 12/2011 | Dunkeld | G06Q 10/10 |
| | | | | 726/4 |
| 2011/0302661 | A1* | 12/2011 | Dunkeld | G06Q 10/10 |
| | | | | 726/28 |
| 2012/0140275 | A1* | 6/2012 | Fukuda | H04N 1/3871 |
| | | | | 358/1.15 |
| 2013/0007898 | A1* | 1/2013 | Dunkeld | G06Q 10/10 |
| | | | | 726/29 |
| 2013/0077817 | A1* | 3/2013 | Naparstek | G06F 21/6209 |
| | | | | 382/100 |
| 2013/0166686 | A1* | 6/2013 | Omar | H04L 9/083 |
| | | | | 709/217 |
| 2013/0260856 | A1* | 10/2013 | Irwin, Jr. | G07F 17/329 |
| | | | | 463/17 |
| 2014/0137270 | A1* | 5/2014 | Dunkeld | G06Q 10/10 |
| | | | | 726/29 |
| 2015/0111630 | A1* | 4/2015 | Irwin, Jr. | G07F 17/329 |
| | | | | 463/17 |
| 2015/0112858 | A1* | 4/2015 | Irwin, Jr. | G07F 17/329 |
| | | | | 705/39 |
| 2016/0164843 | A1* | 6/2016 | Omar | H04L 9/083 |
| | | | | 713/168 |

* cited by examiner

SECURITY IMPROVEMENTS FOR TICKETS

CROSS REFERENCE TO RELATED APPLICATIONS

This application is a National Stage Entry of PCT/GB2013/053111, filed Nov. 25, 2013, which claims priority to GB Patent Application No. 1221183.5, filed Nov. 23, 2012, and GB Patent Application No. 1222266.7, filed Dec. 11, 2012, all of which are incorporated herein by reference in their entirety.

BACKGROUND OF THE DISCLOSURE

The present invention relates to security improvements for use in ticket distribution systems, and in particular for use in lottery ticket distribution systems, where the size of the data management task is very large.

In known ticket distribution systems it is often necessary for each distributed ticket to be uniquely identifiable for redemption purposes. For this reason, the ticket often comprises a unique identifier, which often relates to an identification insignia, such as a serial number, barcode or functionally similar marking. This enables the ticket to be uniquely identified during redemption.

Known solutions require maintaining a secure database comprising a record of the unique identifier for each issued ticket, which can be cross-referenced during redemption. The storage requirements for maintaining such a database are significant. For example, lottery distribution systems may regularly distribute in excess of several billion tickets per annum. In the UK alone, 6 to 9 billion lottery tickets are distributed on average each year. This requires maintaining a database comprising at the very least 6 to 9 billion unique identifier entries which can be cross-referenced. Furthermore records must be maintained for several years, especially where the ticket may be associated with a long term maturity date. This exasperates storage requirements even further. For example, if records must be maintained for at least a ten year period, then the database will need to comprise approximately 70 billion entries. This is a staggeringly large number of entries, and the ability to cross-reference the database in real-time is significantly compromised, if not rendered substantially impossible for practical purposes.

The aforementioned problems are especially pertinent in multifunction ticket distribution systems such as described in the applicant's co-pending international patent application (published as WO2009/019602), which is included herein by reference insofar as possible under the relevant national law. In such systems, the multifunction ticket represents a registered entry in both a long term event, such as a bearer bond or other form of financial instrument or receipt, and a short term event, such as a lucky-dip draw or similar prize selection process. In accordance with statutory requirements, it is necessary to provide the maturity dates for both events on the face of the multifunction ticket. For example, if the long term event matures in twenty years' time, then this long term event maturity date must be visibly provided on the face of the issued ticket. Similarly if the short term event matures in one years' time, then this short term maturity date must also be visibly provided on the face of the issued ticket. Additionally, the algorithm used to generate the unique ticket identifier often uses the maturity dates of respectively the long and short term events as at least one of the inputs. Accordingly, it is conceivable that a fraudulent user could infer the employed algorithm on the basis of some of the known inputs, using for example sniffing and/or other packet analysis techniques.

One known solution to this problem is to disassociate the content of the unique ticket identifier from the identifier itself. The unique ticket identifier, which is visible on the issued ticket, is then effectively a lookup address used by a verification database to identify the correct database entry. On being provided with some further relevant information, which will be dependent on the particular application, the correct entry in the verification database may be cross-referenced for consistency with the further provided information. However, this solution suffers from the same excessively high storage requirements as described above, and therefore is not a practically implementable solution in ticket distribution systems where ticket data for a large number of tickets must be stored for a relatively long period of time, and is especially unsuited for use in multifunction ticket distribution systems of the type previously described.

The embodiments described herein provide a solution to improve the security of ticket distribution systems, and in particular to improve the security of multifunction ticket distribution systems, which solution does not suffer from the storage requirements of the known prior art.

BRIEF DESCRIPTION OF THE DISCLOSURE

The embodiments described herein combine aspects of the applicant's co-pending international patent application (published as WO2011/161660, and which is incorporated herein by reference in so far as permitted by national law) with ticket distribution systems, in particular to multifunction ticket distribution systems.

A first aspect relates to a method of validating the authenticity of a ticket including a unique ticket identifier generated at an issuing terminal in accordance with a confidential algorithm. The unique ticket identifier includes ticket verification information combined with extraneous information. The method includes the receiving one or more identification variable values expressed with respect to a first coordinate measurement domain, the one or more identification variable values enabling the location of the ticket verification information within the unique ticket identifier to be determined, using a coordinate transform function configured to map coordinate values from the first coordinate measurement domain to a second coordinate measurement domain to calculate one or more values of the one or more received identification variable values with respect to the second coordinate measurement domain, extracting the verification information from the unique ticket identifier on the basis of the calculated identification variable values, and verifying the authenticity of the ticket on the basis of the extracted verification information.

The unique ticket identifier provides a self-contained ticket verification authentication means. Provided that the confidentiality of the first and second coordinate measurement domains are maintained, then the confidentiality of the location of the ticket verification information is also maintained. An eavesdropper is unable to recover the ticket verification information without knowledge of the first coordinate measurement domain. Similarly, knowledge of the coordinate transform function adopted by a receiving entity is only useful to an eavesdropper where the second measurement domain is known. Concealing the ticket verification information within the unique ticket identifier obviates the need to maintain large databases including ticket verification information, required to verify the authenticity of a ticket, at a verification entity, since each ticket's unique ticket identifier includes this information.

In certain embodiments, the verification information may include first bibliographic information associated with the ticket. The extracting step further includes extracting the first bibliographic information from the unique ticket identifier; and the verifying step includes comparing the first bibliographic information with second bibliographic information and determining if the first bibliographic information is consistent with the second bibliographic information. The first and second bibliographic information may relate to any one or more of: ticket maturity date; date of issuance of ticket; and a unique issuing terminal identifier associated with the ticket issuing terminal that issued the ticket. Consistency of the first and second bibliographic information is indicative of an authentic ticket.

The second bibliographic information may be provided on the ticket. In this way, a verification entity is able to read the second bibliographic information directly from the ticket and compare it with the first bibliographic information included within the unique ticket identifier, to determine if the second bibliographic information is consistent with the first bibliographic information. This further obviates the need to maintain large databases at a verification entity.

In certain embodiments, the method includes receiving a unique issuing terminal identifier, the unique issuing terminal identifier being indicative of the issuing terminal that issued the ticket, and determining the appropriate coordinate transform function to use for mapping coordinate values from the first measurement domain to the second measurement domain on the basis of the received unique issuing terminal identifier. This further improves security, since each issuing terminal may adopt a different coordinate measurement domain. In this way, should the security of one issuing terminal be compromised, and specifically should the coordinate measurement domain adopted by the issuing terminal be compromised, then the security of other issuing terminals is still maintained.

The unique issuing terminal identifier may be provided on the ticket. In this way, when the ticket is presented for authentication, the verification entity is able to readily identify the issuing terminal, and hence the appropriate coordinate transform function required to express the one or more received identification variable values in the verification entities adopted coordinate measurement domain. Such embodiments may require maintaining a database of unique issuing terminal identifiers and associated coordinate transform functions. However, since the number of issuing terminals is significantly less than the total number of issued tickets, the storage requirements are several orders of magnitude less than known prior art systems including databases of the unique identifiers of all issued tickets.

In alternative embodiments the location of the ticket verification information within the unique ticket identifier is dependent on an algorithm including a unique algorithm component unique to the ticket. The receiving step further includes receiving one or more unique algorithm component variables, the unique algorithm component variables enabling the unique algorithm component to be determined for the ticket; determining the unique algorithm component on the basis of the received unique algorithm component variables, amending the coordinate transform function to include the unique algorithm component, enabling the verification information to be accurately extracted from the unique ticket identifier, and the using step includes using the amended coordinate transform function to calculate the one or more values of the one or more received identification variable values with respect to the second coordinate measurement domain. Use of an algorithm including a unique algorithm component unique to each issued ticket is advantageous since it introduces a further level of security. In such embodiments, the appropriate coordinate transform is now ticket dependent. Accordingly, should an eavesdropper (or other fraudulent user) obtain the appropriate coordinate transform function required to express the one or more identification variable values for a specific ticket in the eavesdropper's adopted coordinate measurement domain, then the coordinate transform can only be accurately used for the subject ticket. Use of the same coordinate transform function on other tickets will generate invalid results.

The unique algorithm component may be a time-dependent component, dependent on the time of issuance of the ticket.

In certain embodiments the one or more identification variable values are included within the unique ticket identifier at a predetermined location known to a receiving entity, and the receiving step further includes recovering the one or more identification variable values from the predetermined location within the unique ticket identifier. This reduces the number of distinct data exchanges required with the receiving entity.

The unique ticket identifier includes a data header, the one or more identification variable values are included within the data header, and the recovering step includes recovering the one or more identification variables values from the data header. Within the present context by data header is intended supplemental data placed at a known location within a block of data. Data headers are conventionally placed at the beginning or end of a block of data. The use of a data header provides a convenient way of communicating the identification variable values to the receiving entity in a single data exchange along with the unique ticket identifier.

In a further embodiment the ticket includes one or more perforations arranged at predetermined locations on the ticket in accordance with a predetermined algorithm, and the method includes receiving one or more perforation identification variable values expressed with respect to the first coordinate measurement domain, the one or more perforation identification variables being indicative of the locations of the one or more perforations on the ticket, using the coordinate transform function to calculate one or more values of the one or more received perforation identification variable values with respect to the second coordinate measurement domain, verifying if the locations of observed perforations are consistent with the calculated one or more perforation identification variable values.

The use of perforations is advantageous insofar as it increases the difficulty in forging tickets by photocopying. The perforations may be of the order of several millimeters in diameter, or alternatively may be of the order of a millimeter or smaller in diameter. This means that very accurate photocopies of a ticket are required in order to generate an accurate forgery, which accurately captures the positions of all the perforations. This inevitably increases forging costs considerably, and reduces the economic benefit to a forger, in particular where the ticket is associated with a relatively low economic value. Furthermore, the perforations provide yet a further security feature, which is verified to determine the authenticity of a ticket. If the locations of the observed perforations are inconsistent with the one or more perforation identification variable values, then this is indicative of a fraudulent ticket; and similarly if the observed locations of the perforations are consistent with the one or more perforation identification variable values, then this is indicative of an authentic ticket.

The unique ticket identifier may include a data header, and the one or more perforation identification variable values are included within the data header, and the method includes recovering the one or more perforation identification values from the data header.

A second aspect relates to a method of generating a ticket including a unique ticket identifier, the unique ticket identifier providing a verification means for verifying the authenticity of the ticket. The method includes generating the unique ticket identifier by combining ticket verification information with extraneous information in accordance with a confidential algorithm, and defining one or more identification variable values, the identification variable values enabling the ticket verification information to be distinguished from the extraneous information within the unique ticket identifier, to enable a ticket verification entity to determine the authenticity of the ticket by verifying the ticket verification information. This second aspect of benefits from the same advantages as the first aspect, and in particular provides a convenient method of generating a ticket whose authenticity may be easily verified without requiring maintenance of large verification databases and the associated storage requirements.

The generating step includes defining the one or more identification variable values with respect to a confidential first coordinate measurement domain, enabling the ticket verification information to be verified by the ticket verification entity by applying a coordinate transform function to map the one or more identification variable values from the first coordinate measurement domain to a second coordinate measurement domain adopted by the ticket verification entity.

The ticket verification information may include bibliographic information associated with the ticket, and the generating step includes combining first bibliographic information with the extraneous information in accordance with the confidential algorithm, and the method further includes providing second bibliographic information on the ticket, enabling the ticket verification entity to determine the authenticity of the ticket by comparing the first bibliographic information and the second bibliographic information, and determining if the first and second bibliographic information is consistent.

The bibliographic information may relate to any one or more of: ticket maturity date; date of issuance of ticket; and a unique issuing terminal identifier associated with the ticket issuing terminal that issued the ticket.

The generating step may include combining the ticket verification information with extraneous information in accordance with a confidential algorithm including a unique algorithm component unique to the ticket, and the defining step includes defining one or more unique algorithm component variables, the unique algorithm component variables enabling the ticket verification entity to determine the unique algorithm component. As mentioned previously in relation to the first aspect and its associated embodiments, this feature is advantageous since it introduces a further level of security. Since the appropriate coordinate transform is now ticket dependent, should an eavesdropper (or other fraudulent user) obtain the appropriate coordinate transform function required to express the one or more identification variable values for a specific ticket in the eavesdropper's adopted coordinate measurement domain, then the coordinate transform can only be accurately used for the subject ticket. Use of the same coordinate transform function on other tickets will generate invalid results.

In certain embodiments the generating step includes combining the ticket verification information with the extraneous information in accordance with the confidential algorithm including a time-dependent unique algorithm component dependent on the time of issuance of the ticket.

The generating step may include providing the one or more identification variable values within the unique ticket identifier at a predetermined confidential location known to the ticket verification entity.

The unique ticket identifier may include a data header, and the generating step may include providing the one or more identification variable values within the data header.

In a further embodiment, the ticket includes one or more perforations arranged at predetermined locations on the ticket in accordance with a predetermined algorithm, and the method comprises defining one or more perforation identification variable values expressed with respect to a first coordinate measurement domain, the one or more perforation identification variable values being indicative of the locations of the one or more perforations on the ticket, to enable the ticket verification entity to determine the authenticity of the ticket by determining if locations of one or more observed perforations are consistent with the one or more perforation identification variable values. This embodiment provides the same advantages as set out in relation to the corresponding embodiment of the first aspect.

The unique ticket identifier may include a data header, and the generating step may include providing the one or more perforation identification variable values within the data header.

A third aspect relates to a ticket authentication terminal arranged to verify the authenticity of a received ticket including a unique ticket identifier, the unique ticket identifier including ticket verification information combined with extraneous information. The ticket verification terminal includes a ticket receiving module arranged to receive a ticket for authentication, a receiver arranged to receive one or more identification variable values expressed with respect to a first coordinate measurement domain, the one or more identification variable values enabling the location of the ticket verification information within the unique ticket identifier to be determined, a processing module arranged to calculate one or more values of the one or more identification variable values with respect to a second coordinate measurement domain, an extracting module arranged to extract the verification information from the unique ticket identifier on the basis of the calculated one or more identification variable values, and a ticket authentication module arranged to determine the authenticity of the ticket on the basis of the extracted verification information.

A fourth aspect relates to a ticket issuing terminal ticket arranged to issue a ticket including a unique ticket identifier, the unique ticket identifier including ticket verification information combined with extraneous information. The ticket issuing terminal includes a ticket identifier generating module arranged to combine ticket verification information with extraneous information in accordance with a confidential algorithm, the ticket verification information enabling the authenticity of the ticket to be verified, a processing module arranged to generate one or more identification variable values expressed with respect to a first coordinate measurement domain, the one or more identification variable values enabling the location of the ticket verification information within the unique ticket identifier to be determined, and a ticket issuing module arranged to issue a ticket including the unique ticket identifier.

Features of the first aspect may be applied where appropriate to the second, third and fourth aspects.

BRIEF DESCRIPTION OF THE DRAWINGS

In order that the disclosure may be more readily understood, embodiments will now be described, by way of non-limiting example, with reference to the following figures, in which.

DETAILED DESCRIPTION OF THE DISCLOSURE

Figure 1:
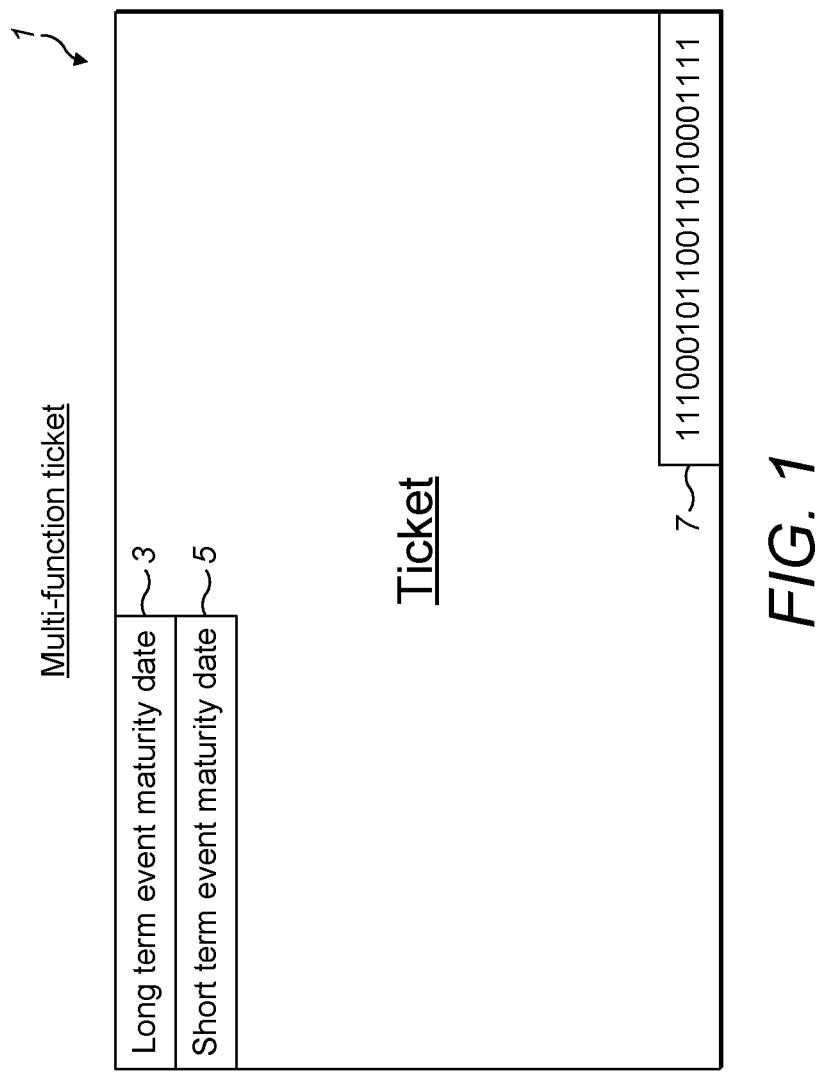
FIG. 1 is a schematic illustration of an example multifunction ticket.

FIG. 1 is an example of a multifunction ticket 1 of the type previously described, and suitable for use with the system and method described herein. The multifunction ticket 1 is associated with both a long-term event, such as a bearer bond or other form of financial instrument having a long-term maturity date 3; and a short-term event, such as a lucky-dip prize draw for example, having a short term maturity date 5. Both the long and short term maturity dates 3, 5 are clearly visible on an exterior surface of the ticket 1. The ticket 1 also comprises a unique ticket identifier 7, which can relate to any form of identification insignia. For example, the unique ticket identifier 7 can relate to a serial number, a 2D- or 3D-barcode, or simply a bit-string. The unique ticket identifier 7 provides a means to verify the authenticity of the multi-function ticket 1 during ticket redemption, and is unique to each issued ticket.

Figure 2:
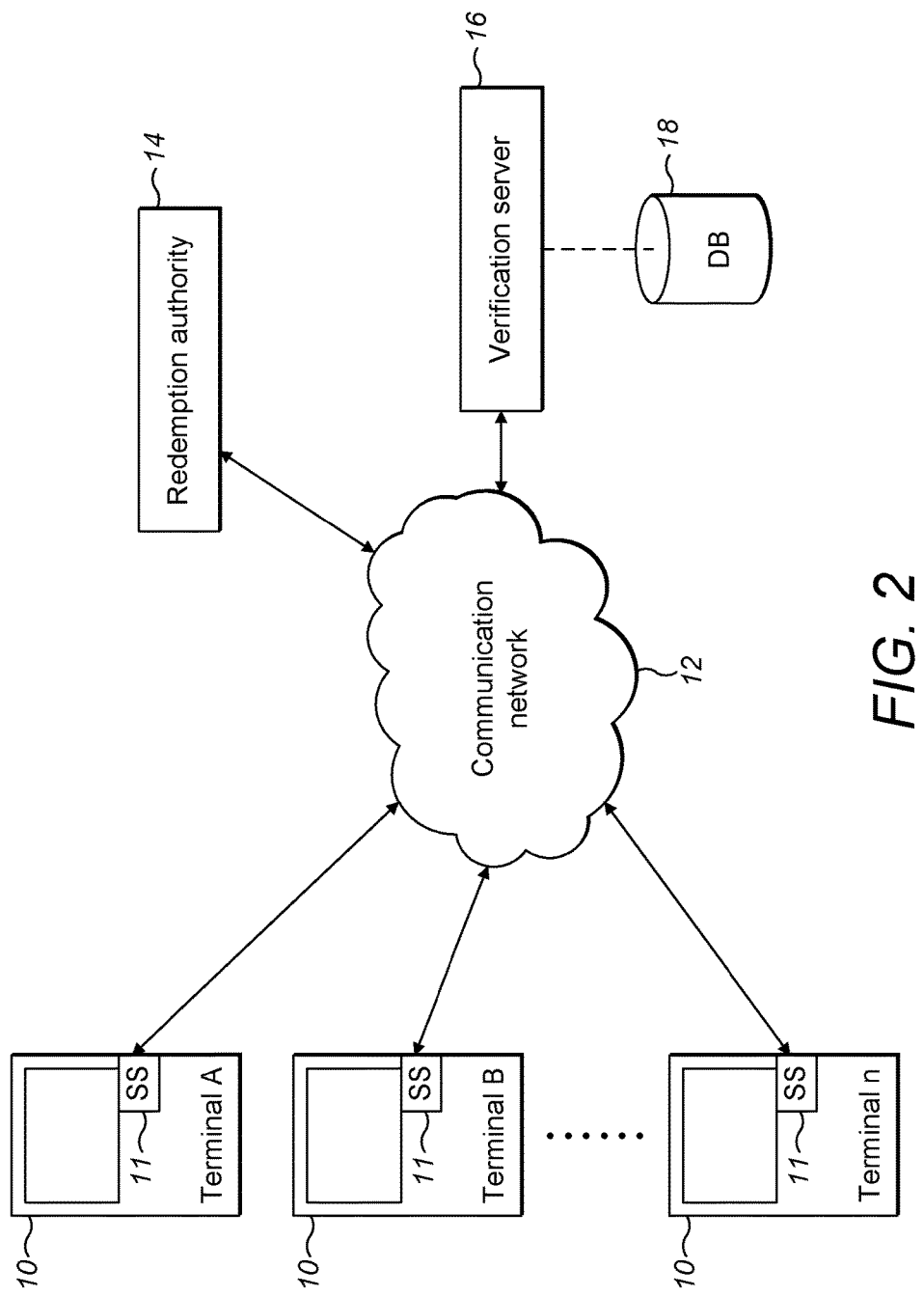
FIG. 2 is a schematic illustration of an example ticket distribution system.

FIG. 2 is an illustrative example of a system in which the present method may be employed.

Terminals A to n 10 are remotely located from each other, and are configured to distribute the multifunction ticket of FIG. 1. Each terminal 10 may be located at a different point of sale. The point of sale may relate, for example, to a supermarket, a kiosk, or any other location where it may be desirable to issue the multifunction ticket 1. Each terminal 10 is uniquely identifiable through an associated unique issuing terminal identifier 11. The terminals 10 may be networked via a shared communication network 12.

Multifunction tickets 1 issued by the terminals 10, are redeemed at a redemption authority 14. Where the multifunction ticket relates to a lottery ticket or other form of financial instrument, the redemption authority 14 may relate to a bank or other entity administering the lottery.

On being presented with a multifunction ticket 1 for redemption, the redemption authority 14 forwards, at the very least, the unique ticket identifier 7 to a verification server 16. The verification server 16 uses the received unique ticket identifier 7 to verify the authenticity of the presented multifunction ticket 1. In contrast with known prior art solutions, the verification server 16 does not maintain a record of all issued unique ticket identifiers. Instead, concealed within the provided unique ticket identifier 7 is ticket verification information. By analysing this ticket verification information, the server is able to determine if the multifunction ticket 1 is authentic.

The verification server 16 and the redemption authority 14 may relate to the same physical entity, for example to a bank. It is important to appreciate that FIG. 2 illustrates the different functional components of the system within which the embodiments described herein may be implemented. However, it is to be appreciated that a single physical entity could include different functional components. Accordingly, it is not essential for present purposes that the redemption authority 14 and the verification server 15 are physically separate entities.

The verification server 16 is provided with a verification database 18. The verification database 18 includes a record of the unique issuing terminal identifier 11 associated with each authorised terminal 10. As will be described in further detail below, these records help to enable the verification server 16 to establish whether the multifunction ticket 1 provided for redemption is authentic, and in turn whether to proceed with redemption.

In order to minimise storage requirements at the verification server 16, the unique ticket identifier 7 has a sufficiently high information content, such that the verification server 16 is able to verify its validity substantially on the basis of the information content therein. Specifically, the verification server 16 is able to determine the authenticity of the multifunction ticket 1, on the basis of the ticket verification information concealed within the unique ticket identifier 11. In this way, the unique ticket identifier 7 provides a self-contained authentication verification means.

The unique ticket identifier 7 includes ticket verification information concealed within extraneous information. By extraneous is intended information which is not used by the verification server 16 in the verification process, and whose object is to camouflage the ticket verification information. In practice, the ticket verification information is indistinguishable from the extraneous information.

The position of the ticket verification information within the unique ticket identifier 7 may be specified by coordinates expressed with respect to a confidential coordinate measurement domain adopted by the terminal 10. In the present description the terms 'coordinates' and 'variables' are interchangeable, and are intended to refer to one or more identification variables, which define the position of the ticket verification information within the unique ticket identifier 7. In other words, the one or more identification variables enable the ticket verification information to be distinguished from the extraneous information included within the unique ticket identifier.

In certain embodiments, the verification server 16 is provided with the correct coordinate transform required to express the received identification variables with respect to its own coordinate measurement domain. This helps to maintain the confidentiality of the measurement domains adopted by both the issuing terminal 10 and the verification server 16, since it is not necessary to communicate the issuing terminal's adopted measurement domain to the verification server 16, or vice versa. At most, in some embodiments the coordinate transform function may need to be communicated to the verification server 16. However, knowledge of this function alone does not enable an eavesdropper to recover the concealed ticket verification information, as is described in further detail below. In alternative embodiments, the verification server 16 may be pre-configured with the required coordinate transform. The verification server 16 is able to separate the ticket verification information from the extraneous information using the correct coordinate transform function.

By maintaining the confidentiality of the coordinate system adopted by the issuing terminal 10, an eavesdropper, having intercepted or otherwise acquired the one or more identification variable values, will be unable to accurately distinguish between extraneous information and ticket verification information within the intercepted unique ticket identifier 7. Knowledge of both the identification variable values and the coordinate measurement domain with respect to which the identification variable values are defined is required, in order to distinguish the ticket verification information from the extraneous information within the unique ticket identifier 7.

It will be appreciated that this method requires that the verification server 16 be provided with the correct coordinate transform function required to express the received one or more identification variable values with respect to its own adopted coordinate measurement domain, to enable the verification server 16 to distinguish ticket verification information from extraneous information within the unique ticket identifier 7. One way in which this requirement may be satisfied is by pre-configuring the verification server 16 with the required coordinate transforms at the source of manufacture.

In such embodiments, and as mentioned previously, each issuing terminal 10 may be provided with a unique issuing terminal identifier 11. The unique issuing terminal identifier 11 is subsequently used by the verification server 16 to identify the correct coordinate transform function for use. For example, the verification server 16 may use the received unique issuing terminal identifier 11 to consult the operatively connected verification database 18, and to identify the relevant database record that provides the correct pre-configured coordinate transform function for use. This solution is convenient where the verification server 16 is required to verify the authenticity of a plurality of tickets issued by a plurality of different issuing terminals 10, each issuing terminal 10 adopting a different coordinate measurement domain.

To improve security, each issuing terminal 10 may adopt a different coordinate measurement domain, and the choice of coordinate measurement domain may additionally be time dependent. For example, each issuing terminal 10 may adopt a different coordinate measurement domain every x days. In other words, each issuing terminal's employed coordinate measurement domain may be varied periodically at a pre-determined temporal frequency. For example, the employed coordinate measurement domain may be varied on a weekly basis, or on a daily basis. In this way, even if the coordinate measurement domain employed by an issuing terminal 10 is compromised one week, the affected issuing terminal 10 can still be validly used for ticket distribution in a subsequent day or week, depending on the temporal frequency with which the coordinate measurement domain is varied, once a new coordinate measurement domain has been adopted. Another advantage with adopting terminal dependent coordinate measurement domains, is that if the confidentiality of one issuing terminal is compromised, the security of the remaining issuing terminals is maintained, since each terminal adopts a different coordinate measurement domain. Therefore, knowledge of the coordinate measurement domain employed by one issuing terminal provides no information regarding the coordinate measurement domain adopted by another issuing terminal.

In such embodiments, for verification purposes, the verification server 16, in addition to the unique ticket identifier 7 and the identification variable values associated with the ticket verification information, is also provided with the terminal unique identifier 11 and the date of issuance of the ticket. In this way, using the terminal unique identifier 7, the verification server 16 is able to perform a lookup action in the attached database 18, in order to identify the database records associated with the relevant issuing terminal 10. Once the relevant issuing terminal's database records have been identified, the provided date of issuance of the ticket can be used to identify the correct coordinate transform function for use in mapping the received identification variable values into the appropriate coordinate measurement domain. The coordinate transform function is subsequently used in order to express the received identification variable values in the verification server's adopted coordinate measurement domain. The re-expressed identification variable values are then used by the verification server 16 to recover the ticket verification information from the unique ticket identifier. The ticket verification information is required to verify the authenticity of the ticket.

Figure 3:
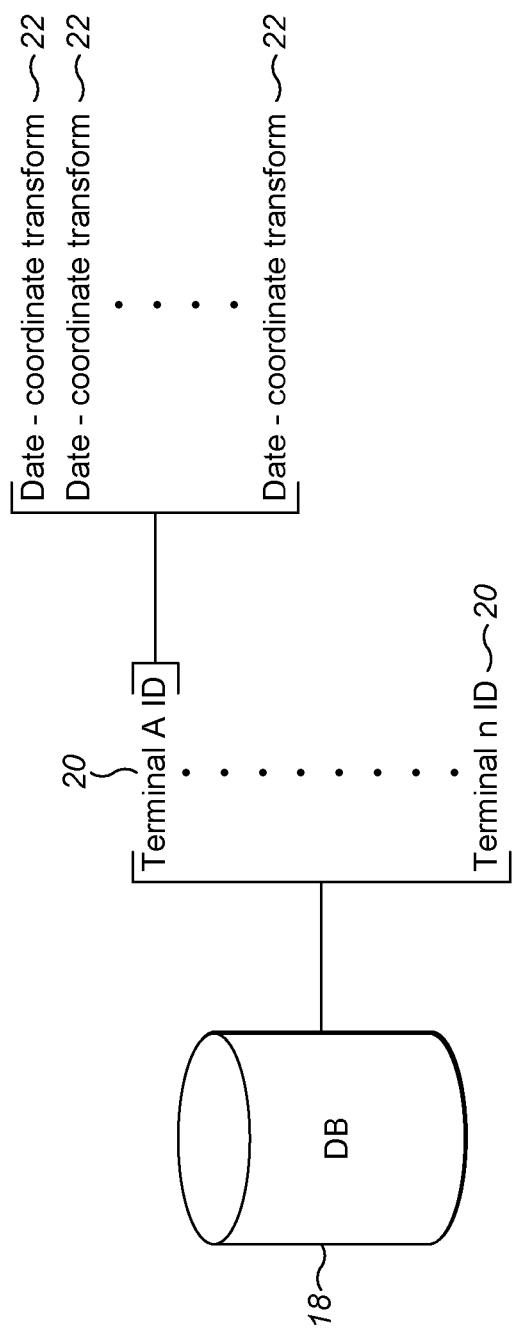
FIG. 3 is a schematic illustration showing the data structure of the verification server database included in the ticket distribution system of FIG. 2.

FIG. 3 provides a schematic illustration of an example of the data structure of the verification server's database 18. The database 18 includes a record of each authorised terminal's unique identifier 20. Associated with each terminal's unique identifier 20 is a complete record of the corresponding coordinate transforms 22 used by the verification server 16 in order to express the received identification variable values with respect to its own adopted coordinate measurement domain. The coordinate transforms 22 are each associated with a ticket issuance date or date range. The verification server 16 selects the correct coordinate transform function on the basis of the ticket's date of issuance.

If the issuing terminal's coordinate measurement domain is varied on a weekly basis, then the verification database 18 needs to maintain 52 entries (since there are 52 weeks in a year) per issuing terminal 10 per annum. Assuming that there are 10,000 different issuing terminals 10 then this means that the verification database 18 must maintain 520,000 different individual entries per annum. This is a significantly lower number of entries than would otherwise have to be maintained if each individual unique ticket identifier was stored in the verification database 18. Furthermore, if records must be maintained for at least ten years, then this means that a total of 5.2 million records are maintained—several orders of magnitude lower than if the unique ticket identifiers of each issued ticket were stored. Furthermore, a database including this number of entries can be searched in real-time.

The verification server 16 requires four items of information in order to verify the authenticity of the ticket 1: 1) the unique ticket identifier 7; 2) the unique issuing terminal's identifier 11; 3) the date of issuance of the ticket; and 4) the identification variable values enabling the ticket verification information to be distinguished from the extraneous information within the unique ticket identifier 7, the identification variable values being denoted $(a_i)$ where i=1, 2, . . . , n, and n is the number of different identification variable values comprised within the unique ticket identifier 7.

In order to minimise the number of distinct data items that are forwarded to the verification server 16 for verification, the different data items may all be compiled and concatenated within the unique ticket identifier 7. For example, the unique issuing terminal identifier 11, the date of issuance of the ticket, and the identification variable values $(a_i)$ could be provided in the data header of the unique ticket identifier 7. In the present context the term data header is used to refer to supplemental data placed at the beginning of a block of data. The order in which these data items are provided in the data header is predetermined, such that the verification server 16 is aware of the location of each required data item within the header. In this way, upon receipt of the concatenated unique ticket identifier 7, the unique issuing terminal identifier 11, the date of issuance of ticket, and the identification variable values ($a_i$) can be obtained directly from the header; the required coordinate transform function can be obtained from the verification database 18 using the unique terminal identifier 11, and the ticket's date of issuance; the ticket verification information can then be recovered from the unique ticket identifier 7 in the previously described manner.

It is important to note that even if an eavesdropper is able to recover the information comprised in the header, without knowing the coordinate measurement domain that the identification variable values are expressed with respect to, the eavesdropper is unable to distinguish the ticket verification information from the extraneous information comprised within the unique ticket identifier 7. The eavesdropper will therefore be unable to infer the confidential algorithm used to generate the unique ticket identifier 7. This will become clearer following a discussion of the process flow chart of FIG. 4 below.

Figure 4:
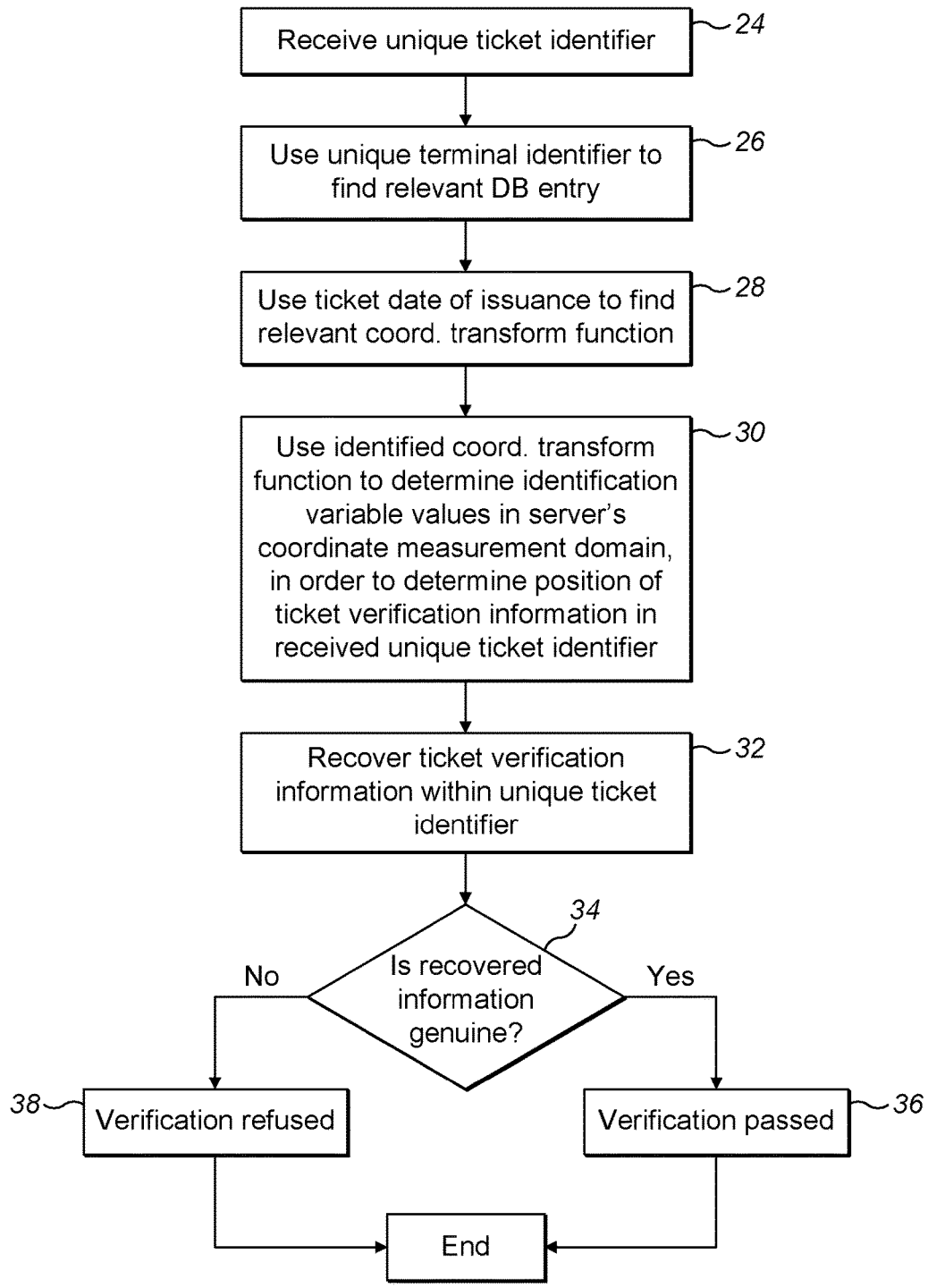
FIG. 4 is a process flow chart illustrating the ticket authentication method adopted by the verification server of FIG. 2.

FIG. 4 is a process flow chart outlining the steps carried out at the verification server 16 in verifying the authenticity of a ticket.

The concatenated unique ticket identifier 7 is received, at step 24. Upon receipt, the verification server 16 reads the contents of the header to recover the date of issuance of the ticket, the identification variable values associated with the position of the ticket verification information within the unique ticket identifier 7, and the unique issuing terminal identifier associated with the issuing terminal 10.

The unique issuing terminal identifier is used by the verification server 16, at step 26, to carry out a lookup operation to identify the relevant database record 20 within the verification database 18.

Once the relevant database record 20 has been identified, the date of issuance, which may relate to a time stamp associated with the date and optionally the time of issuance of the ticket 1, is used to identify the relevant coordinate transform function 22 required to express the one or more identification variable values with respect to the verification server's 16 adopted coordinate measurement domain. Conversion of the received one or more identification variable values into the coordinate measurement domain adopted by the verification server 16, is carried out at step 30.

Once the identification variable values have been converted to the verification server's adopted coordinate measurement domain, the verification server 16 proceeds to recover the ticket verification information concealed within the unique ticket identifier 7.

The recovered ticket verification information is then compared and cross-referenced with known bibliographic ticket information, at step 34, in order to determine whether the algorithm used for generating the unique ticket identifier 7 is genuine. For example, the ticket verification information may relate, amongst other things, to ticket maturity date, ticket date of issuance, and the unique issuing terminal identifier. The recovered ticket verification information is then compared with the known bibliographic information in order to determine if the information is consistent, at step 34. If the recovered ticket verification information matches the known bibliographic information, then this is indicative that a genuine algorithm was used to generate the unique ticket identifier 7, and verification is successfully passed at step 36.

Otherwise, verification is refused at step 38. In both instances the ticket authentication verification process is subsequently terminated. It is to be noted that verification of the recovered ticket verification information serves to indicate whether the unique ticket identifier 7 was generated with a genuine algorithm. The algorithm defines where the ticket verification information is located within the unique ticket identifier, and how the ticket verification information is combined with the extraneous information. The content of the ticket verification information itself is of secondary importance and only serves to provide a reference point which the verification server 16 may use to determine if a genuine algorithm was employed by the ticket issuing terminal 10 in generating the ticket's unique identifier.

In a further embodiment, the position of the ticket verification information within the unique ticket identifier 7 may be defined with respect to a confidential function $f(x)$ which is unique to each issued ticket. For example, the algorithm could include a ticket-dependent corrective parameter $C_n$ and be of the form:

$$f(x)=x^2+C_n, n \in \mathbb{N} \qquad \text{eq.1.0}$$

where n is indicative of the $n^{th}$ issued ticket and is a positive real integer. The form of the function is immaterial and any type of function could be used, including any degree of polynomial. The above illustrated second degree polynomial is merely provided for illustrative purposes in order to facilitate the reader's understanding of the present embodiment and is not to be understood as limiting.

$C_n$ is an evolving corrective term, which is unique for each issued ticket. For example, $C_n$ could relate to a series sequence of randomly generated numbers, and introduces a coordinate shift in accordance with the series value for the particular value of n. For example, $C_n$ could relate to the following sequence:

$$C_n=2,5,8,4,9,1,6,\ldots n=\{1,2,3,\ldots\} \qquad \text{eq.1.1}$$

In other words, $C_1=2$, $C_2=5$, $C_3=8$ and so forth.

In order to verify the validity of the generated unique ticket identifier 7, the verification server 16, and specifically the verification database 18, is provided with the details of the corrective parameter $C_n$. Furthermore, the verification server 16 is also provided with the sequence number value for n. In this way, the verification server 16 is able to determine the value of the corrective parameter $C_n$ used when generating the received unique ticket identifier 7.

The value of n may be provided in the unique ticket identifier header, along with all the other previously described data, associated with the received unique ticket identifier 7. Furthermore, the database records 20 associated with each terminal 10, may also define the employed corrective parameter $C_n$. This may take the form of an additional database entry associated with the coordinate transform function 22. In other words, one additional database entry may be required for each specified coordinate transform function 22. In one year, assuming that the coordinate transform function varies on a weekly basis, this requirement results in an additional 52 database records.

In this way, and making reference to the process flow chart of FIG. 4, when the unique ticket identifier 7 is received at step 24, in addition to the previously described information that is obtained from the header, the value of n is also obtained. The relevant verification database records are identified in the afore-described manner, except that at step 28, in addition to obtaining the relevant coordinate transform function, the value of the corrective parameter needs to be determined using the provided value of n, and the associated corrective parameter function $C_n$. Subsequently, the selected coordinate transform function is modified to take into account the corrective parameter value. The remaining verification steps proceed as previously described. Since the corrective parameter function $C_n$ is predetermined and provided to the verification database 18 at the source of manufacture, it can be expressed with respect to the verification server's adopted coordinate frame.

Alternatively, the corrective parameter function $C_n$ may be appended to the unique ticket identifier's data header, and expressed either in the verification server's adopted coordinate measurement domain or in the issuing terminal's adopted coordinate measurement domain.

The advantage of the afore described embodiments is that a further variable is introduced in the ticket verification authentication process, providing an additional level of complexity, which reduces the likelihood of a fraudulent user being able to infer the adopted algorithm and generate fraudulent tickets and/or fraudulent unique ticket identifiers.

It is important to appreciate that the corrective parameter $C_n$ could relate to any type of mathematical function. For example, it could relate to a complex series. The above provided examples are provided for illustrative purposes only. Real world implementations of the present embodiment are likely to adopt substantially more complex functions.

It is also important to note that whilst in the presently described examples configuration of the verification server's database with, for example, the corrective parameters, and similarly configuration of the issuing terminals 10 with the corrective parameters occurs at the source of manufacture, alternative arrangements can be made. For example, each one of the issuing terminals 10 and the verification database 18 could be periodically configured with new corrective parameters by an authorised engineer. In this way there is little risk of the confidentiality of the employed algorithms being compromised.

In a further embodiment, in order to reduce the risk that a ticket now having all security and verification information on it could in theory be photocopied and validly redeemed, one or more small perforations are introduced onto the ticket, providing a further security verification means, in accordance with the applicant's co-pending PCT patent application, having publication number WO 2011/161661 A2, and which is incorporated herein by reference insofar as permissible by national law.

The one or more perforations are effectively very small holes. These perforations may be of the order of several millimeters in diameter. Alternatively, they may be of the order of a millimeter in diameter, or smaller.

The position of the one or more perforations may be generated at the issuing terminal in accordance with a confidential algorithm. The geometrical position of the one or more perforations on the face of the ticket may be concealed within the ticket unique identifier 7, in a similar manner as previously described. In this way, each ticket may include a unique geometrical distribution of perforations, the precise geometrical distribution being specified within the ticket's unique identifier.

On validation, the perforated ticket is illuminated. Light incident on the perforations will shine through the perforations and will trace a geometrical shape. The geometric distribution of the perforations may be inferred from the observed geometrical shape. In the same manner as described previously, the geometrical distribution of the perforations can be obtained from analysis of the ticket's unique identifier, and compared with the observed geometrical distribution. Any inconsistency between the observed geometrical distribution and the geometrical distribution recovered from the unique ticket identifier is indicative of a fraudulent ticket, and verification may be refused.

In order to protect against photocopying, the ticket may be printed on a textured material. By textured is intended a material having a surface profile comprising ridges and other surface anomalies, such that the cross-sectional profile of the ticket comprises significant variations. When photocopied, these ridges and other surface anomalies are indistinguishable from a perforation, since they appear as darkened areas and/or points on the ticket surface.

In this way, if an authentic ticket is photocopied the location of the perforations and the location of the surface anomalies and/or ridges are indistinguishable.

Security may also be improved by printing coloured dots, including grey scale and or black shaded dots on the ticket. When the ticket is photocopied, the dots are indistinguishable from genuine perforations in the photocopied ticket. This is best illustrated considering an example where a machine is used to replicate fraudulent tickets, using an authentic ticket comprising the coloured dots as a template. The coloured dots are likely to be mistakenly identified as perforations by the machine, and perforated. At validation, these misplaced perforations enable the fraudulent tickets to be distinguished from authentic tickets.

Furthermore, in embodiments where the geometrical distribution of perforations on the ticket surface are unique to the ticket, if a large number of identical geometrical distributions are observed on validation, then this is indicative of a fraudulent ticket.

The presence of perforations, and in particular microperforations on the face of the ticket increases the difficulty of forging the ticket. For example, where the perforations are substantially small, then a photocopier may not have the ability to accurately reproduce the location of the perforations. Accordingly, the presence of perforations as a security means increases both the technical difficulty of accurately forging the tickets, in addition to increasing the manufacturing costs.

The above described examples are for illustrative purposes only and are not limiting. The skilled reader will appreciate that alternative embodiments substantially based on the herein described principles could equally well be implemented without departing from the scope of the present invention, and such alternatives fall within the scope of the present invention.

The invention claimed is:

1. A method of validating the authenticity of a ticket using a ticket authentication terminal comprising a receiver, a processing module, and a ticket authentication module, the method comprising the steps of:
   generating at an issuing terminal in accordance with a confidential algorithm a unique ticket identifier to be included in the ticket, wherein the unique ticket identifier comprises ticket verification information combined with extraneous information, the ticket comprising one or more perforations arranged at predetermined locations on the ticket in accordance with a predetermined algorithm;
   receiving, at the receiver included in the ticket authentication module, one or more identification variable values from the ticket expressed with respect to a first coordinate measurement domain and one or more perforation identification variable values expressed with respect to the first coordinate measurement domain, the one or more identification variable values enabling a location of the ticket verification information within the unique ticket identifier to be determined, and the one or more perforation identification variable values indicative of the locations of the one or more perforations on the ticket;

using the processing module configured with a coordinate transform function configured to map coordinate values from the first coordinate measurement domain to a second coordinate measurement domain to calculate one or more values of the one or more received identification variable values with respect to the second coordinate measurement domain, and using the coordinate transform function to calculate one or more values of the one or more received perforation identification variable values with respect to the second coordinate measurement domain;

extracting the verification information from the unique ticket identifier on the basis of the calculated identification variable values; and minimizing storage requirements at the ticket authentication terminal by verifying, at the ticket authentication module, the authenticity of the ticket on the basis of the extracted verification information, and verifying when the locations of observed perforations match the calculated one or more received perforation identification variable values, wherein the unique ticket identifier comprises a data header, wherein the one or more perforation identification variable values are included within the data header, and wherein receiving the one or more perforation identification values comprises recovering the one or more perforation identification values from the data header.

2. The method of claim 1, wherein the verification information comprises first bibliographic information associated with the ticket;

the extracting step further comprises extracting the first bibliographic information from the unique ticket identifier; and the verifying step comprises comparing the first bibliographic information with second bibliographic information and determining when the first bibliographic information matches the second bibliographic information, wherein the first and second bibliographic information relates to at least one of:
1) ticket maturity date;
2) date of issuance of ticket; and
3) a unique issuing terminal identifier associated with the ticket issuing terminal that issued the ticket.

3. The method of claim 2, wherein the second bibliographic information is provided on the ticket.

4. The method of claim 1, wherein the method comprises:
receiving a unique issuing terminal identifier, the unique issuing terminal identifier being indicative of the issuing terminal that issued the ticket, wherein the unique issuing terminal identifier is provided on the ticket; and
determining the appropriate coordinate transform function to use for mapping coordinate values from the first measurement domain to the second measurement domain on the basis of the received unique issuing terminal identifier.

5. The method of claim 1, wherein the location of the ticket verification information within the unique ticket identifier is dependent on an algorithm comprising a unique algorithm component unique to the ticket, and the receiving step further comprises:

receiving one or more unique algorithm component variables, the unique algorithm component variables enabling the unique algorithm component to be determined for the ticket;

determining the unique algorithm component on the basis of the received unique algorithm component variables, wherein the unique algorithm component is a time-dependent component, dependent on the time of issuance of the ticket;

amending the coordinate transform function to include the unique algorithm component, enabling the verification information to be accurately extracted from the unique ticket identifier; and using the processing module comprises:
using the amended coordinate transform function to calculate the one or more values of the one or more received identification variable values with respect to the second coordinate measurement domain.

6. The method of claim 1, wherein the one or more identification variable values are comprised within the unique ticket identifier at a predetermined location known to a receiving entity, and the receiving step further comprises:
recovering the one or more identification variable values from the predetermined location within the unique ticket identifier, wherein the one or more identification variable values are comprised within the data header, and the recovering step comprises recovering the one or more identification variables values from the data header.

7. A ticket authentication terminal arranged to verify the authenticity of a received ticket comprising:
one or more processors and memory for performing the following steps:
receive a ticket for authentication, wherein the ticket comprises one or more perforations arranged at predetermined locations on the ticket in accordance with a predetermined algorithm and a unique ticket identifier generated at an issuing terminal in accordance with a confidential algorithm;

receive, in conjunction with a receiver of the ticket authentication terminal, one or more identification variable values from the ticket expressed with respect to a first coordinate measurement domain and one or more perforation identification variable values expressed with respect to the first coordinate measurement domain, the one or more identification variable values enabling the location of the ticket verification information within the unique ticket identifier to be determined, and the one or more perforation identification variable values indicative of the locations of the one or more perforations on the ticket;

calculate, using a coordinate transform function configured to map coordinate values from the first coordinate measurement domain to a second coordinate measurement domain, one or more values of the one or more received identification variable values with respect to the second coordinate measurement domain, and one or more values of the received perforation identification variable values with respect to the second coordinate measurement domain;

extract the verification information from the unique ticket identifier on the basis of the calculated one or more identification variable values; and minimize storage requirements at the ticket authentication terminal by determining the authenticity of the ticket on the basis of the extracted verification information, and verifying when the locations of the observed perforations match the calculated one or more received perforation identification variable values, wherein the unique ticket identifier comprises a data header, wherein the one or more perforation identification variable values are included within the data header, and wherein to receive the one or more perforation identification values, the receiver is configured to recover the one or more perforation identification values from the data header.

8. The ticket authentication terminal of claim 7, wherein the verification information comprises first bibliographic information associated with the ticket, and wherein the one or more processors and memory are for performing the following further steps:
   extract the first bibliographic information from the unique ticket identifier; and
   compare the first bibliographic information with second bibliographic information; and
      determine when the first bibliographic information matches the second bibliographic information, wherein the second bibliographic information is provided on the ticket, and the terminal comprises:
      an optical reader arranged to read the second bibliographic information from the ticket.

9. The ticket authentication terminal of claim 8, wherein the one or more processors and memory are for performing the following further step:
   compare any one or more of the following types of bibliographic information:
      1) ticket maturity date;
      2) date of issuance of the ticket; and
      3) a unique issuing terminal identifier associated with the ticket issuing terminal that issued the ticket.

10. The ticket authentication terminal of claim 7, wherein the one or more processors and memory are for performing the following further step:
   determine an appropriate coordinate transform function for use in calculating the one or more values of the one or more identification variable values with respect to the second coordinate measurement domain.

* * * * *